United States Patent [19]
Fischer et al.

[11] Patent Number: 5,636,860
[45] Date of Patent: Jun. 10, 1997

[54] AIR BAG AND FOLDING METHOD

[75] Inventors: Kurt F. Fischer, Oxford; Jeffrey J. Ferrari, Flint, both of Mich.

[73] Assignee: TRW Vehicle Safety Systems Inc., Lyndhurst, Ohio

[21] Appl. No.: 563,302

[22] Filed: Nov. 28, 1995

[51] Int. Cl.$^6$ ............................................. B60R 21/22
[52] U.S. Cl. ........................ 280/730.1; 280/728.1; 280/743.1
[58] Field of Search .................. 280/728.1, 743.1, 280/730.1, 732, 731, 743.2; 493/243, 405, 940

[56] References Cited

U.S. PATENT DOCUMENTS

| | | | |
|---|---|---|---|
| 3,797,855 | 3/1974 | Wright, Jr. | 280/743.2 |
| 3,947,057 | 3/1976 | Schiesterl et al. | 280/731 |
| 4,173,356 | 11/1979 | Ross | 280/728.2 |
| 4,235,453 | 11/1980 | Lawson et al. | 280/743.1 |
| 4,286,954 | 9/1981 | McArthur et al. | 493/244 |
| 5,022,675 | 6/1991 | Zelenak, Jr. et al. | 280/743.1 |
| 5,048,863 | 9/1991 | Henseler et al. | 280/743.1 |
| 5,140,799 | 8/1992 | Satoh | 53/429 |
| 5,240,282 | 8/1993 | Wehner et al. | 280/728.1 |
| 5,275,435 | 1/1994 | Fischer | 280/743.1 |
| 5,290,061 | 3/1994 | Bollaert | 280/743.1 |
| 5,447,329 | 9/1995 | Hamada | 280/728.1 |
| 5,513,876 | 5/1996 | Matsumoto | 280/728.1 |

FOREIGN PATENT DOCUMENTS

| | | | |
|---|---|---|---|
| 2-279441 | 11/1990 | Japan | 280/743.1 |
| 4-100754 | 4/1992 | Japan | 280/743.1 |
| 5-270346 | 10/1993 | Japan | 280/732 |
| 6-87393 | 3/1994 | Japan | 280/743.1 |
| 6-171449 | 6/1994 | Japan | 280/732 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An inflatable vehicle occupant restraint (14) has a folded condition which causes the restraint (14) to move in a sideways direction when the restraint (14) is unfolded and inflated by inflation fluid entering the restraint (14) through an inlet opening (48). The folded condition of the restraint (14) has a cross-sectional configuration extending across the inlet opening (48). The cross-sectional configuration is defined by pleats (60) having closed outer ends (66) and open inner ends (68) for receiving inflation fluid from the inlet opening (48). All of the pleats (60) extend inward across the cross-sectional configuration from their closed outer ends (66) to their open inner ends (68) in a single, common sideways direction.

20 Claims, 4 Drawing Sheets

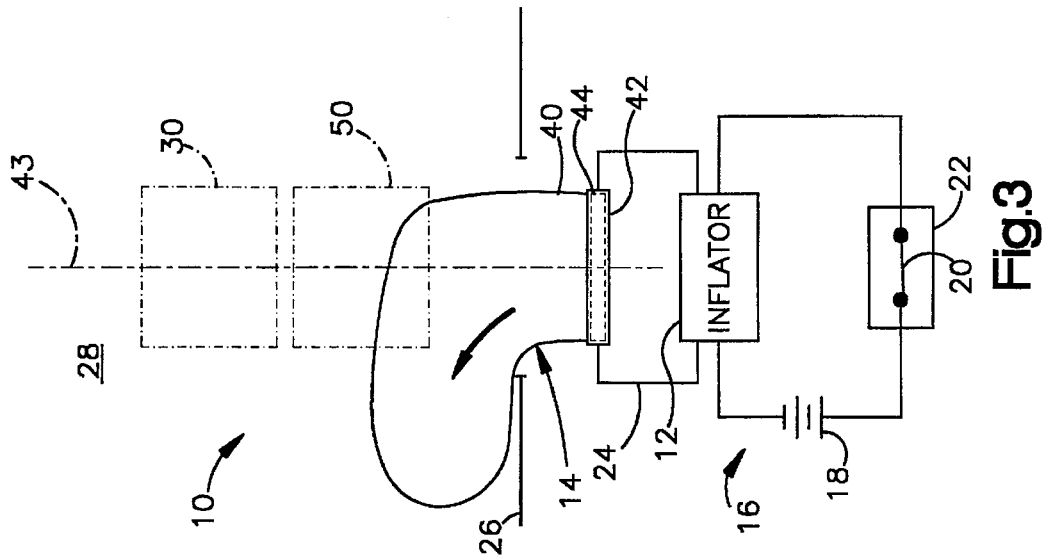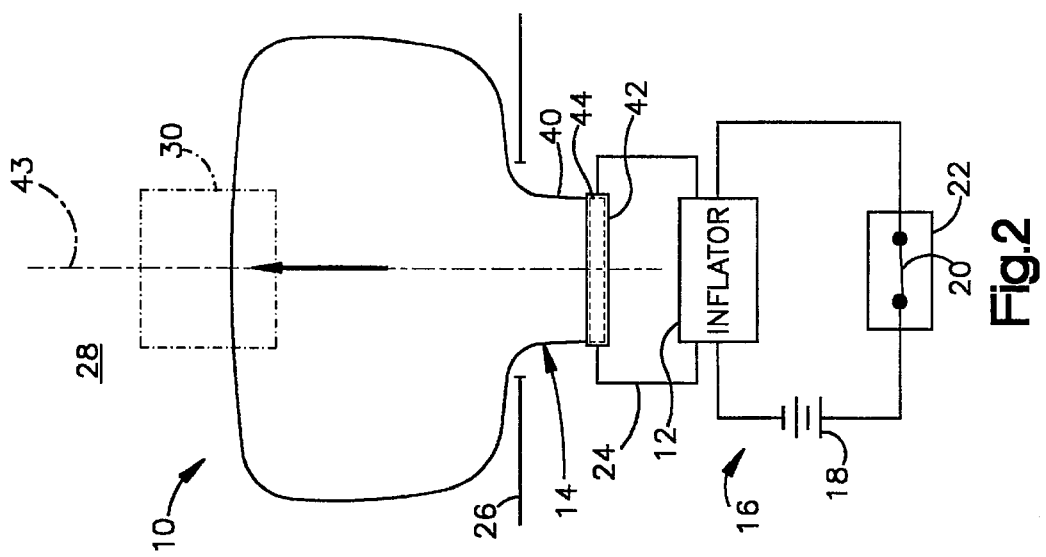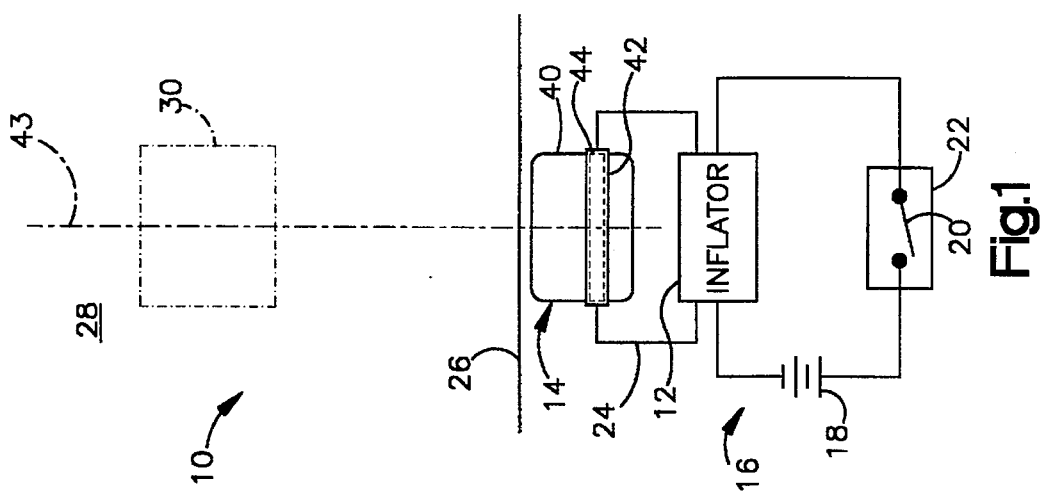

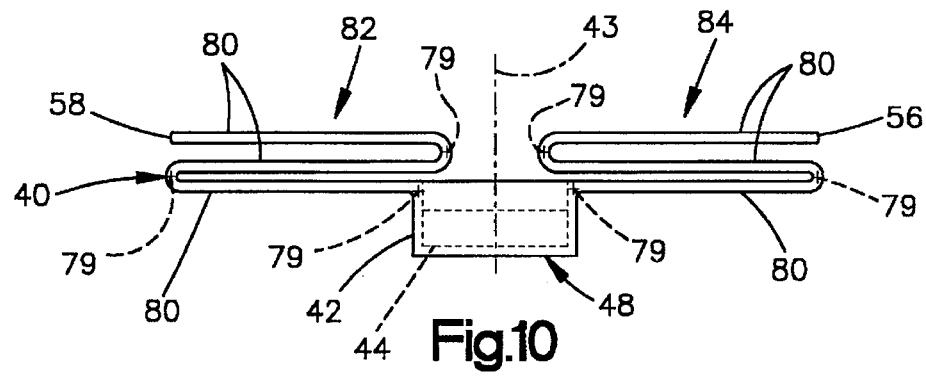
Fig.10
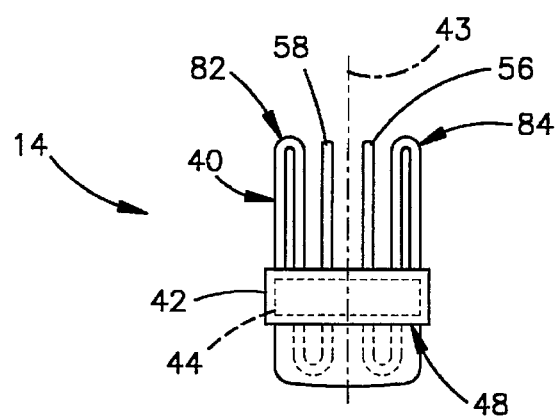
Fig.11
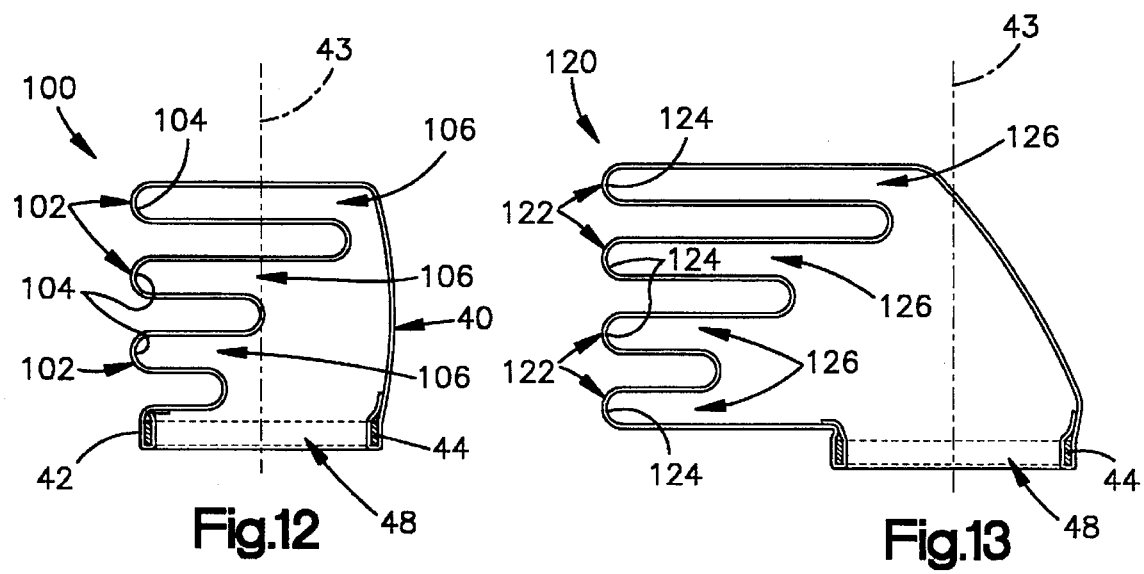
Fig.12
Fig.13

AIR BAG AND FOLDING METHOD

FIELD OF THE INVENTION

The present invention relates to an inflatable vehicle occupant restraint, such as an air bag, and further relates to a method of folding the restraint.

BACKGROUND OF THE INVENTION

A particular type of inflatable vehicle occupant restraint is commonly referred to as an air bag. An air bag is stored in a vehicle in a folded, uninflated condition at a location adjacent to the vehicle occupant compartment. When the vehicle experiences a collision, inflation fluid is directed to flow from a source of inflation fluid into the air bag. The inflation fluid inflates the air bag from the folded, uninflated condition to an unfolded, inflated condition in which the air bag extends into the vehicle occupant compartment.

When the air bag is inflated into the vehicle occupant compartment, it restrains movement of an occupant of the vehicle. The air bag thus helps to restrain the occupant from forcefully striking parts of the vehicle as a result of the collision. The force with which the air bag restrains the occupant is determined in part by the configuration and location of the air bag relative to the occupant as the air bag unfolds and moves into the vehicle occupant compartment.

SUMMARY OF THE INVENTION

The present invention comprises an inflatable vehicle occupant restraint and a method of folding the restraint. The restraint is inflatable from a folded, uninflated condition to an unfolded, inflated condition upon receiving inflation fluid through an inlet opening in the restraint.

In accordance with the present invention, the restraint is folded into a condition in which it has a cross-sectional configuration extending across the inlet opening. The cross-sectional configuration of the air bag is defined by pleats. The pleats have closed outer ends, and have open inner ends for receiving inflation fluid from the inlet opening. All of the pleats extend inward across the cross-sectional configuration from their closed outer ends to their open inner ends in a single, common sideways direction.

An inflatable vehicle occupant restraint which has been folded in accordance with the present invention will move against an out-of-position vehicle occupant in a sideways direction when it is unfolded and inflated into a vehicle occupant compartment. This is because the inflation fluid flows into all of the pleats in the same sideways direction extending from the open inner ends of the pleats to the closed outer ends of the pleats. The inflation fluid thus flows against the pleats so as to move the restraint in a sideways direction as the inflation fluid unfolds and inflates the restraint toward the inflated condition.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of an apparatus including an inflatable vehicle occupant restraint comprising a first embodiment of the present invention;

FIG. 2 is a view similar to FIG. 1 showing the restraint in a fully inflated condition;

FIG. 3 is a view similar to FIGS. 1 and 2 showing the restraint in a partially inflated condition;

FIG. 10 is a view similar to FIG. 9 showing the restraint of FIGS. 1–3 in an intermediate folded condition;

FIG. 11 is a view similar to FIG. 10 showing the restraint of FIGS. 1–3 in a fully folded condition;

FIG. 12 is a cross-sectional view similar to FIG. 7 showing an inflatable vehicle occupant restraint comprising a second embodiment of the present invention; and FIG. 13 is a cross-sectional view similar to FIG. 12 showing an inflatable vehicle occupant restraint comprising a third embodiment of the present invention.

DESCRIPTION OF PREFERRED EMBODIMENTS

Figure 4:
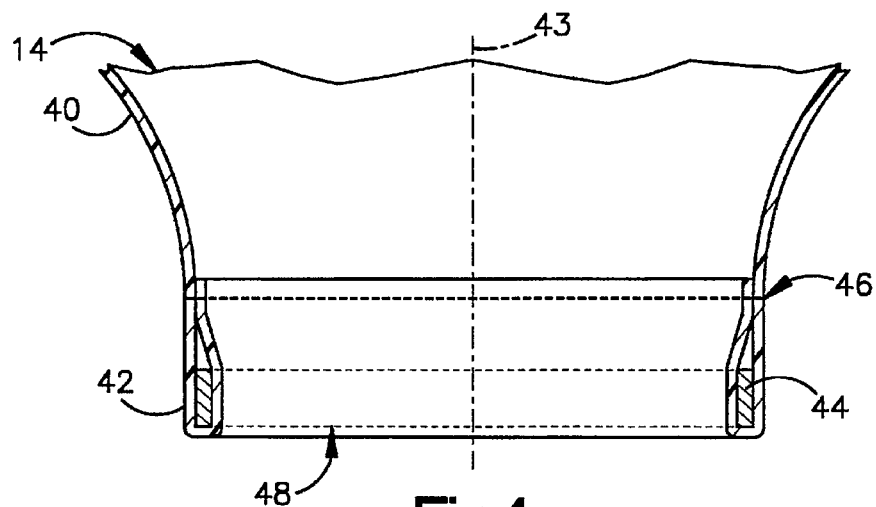
FIG. 4 is an enlarged, partial cross-sectional view of the restraint of FIGS. 1–3.

A vehicle occupant restraint apparatus 10 comprising a first embodiment of the present invention is shown schematically in FIGS. 1–3. The apparatus 10 includes an inflator 12 and a particular type of inflatable vehicle occupant restraint 14 which is known as an air bag. The air bag 14 is inflatable from a folded, uninflated condition, as shown in FIG. 1, to an unfolded, fully inflated condition, as shown in FIG. 2.

The inflator 12 comprises a source of inflation fluid for inflating the air bag 14. As known in the art, the inflator 12 may contain an ignitable gas generating material for generating a large volume of gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 which senses a condition indicating the occurrence of a vehicle collision. Such a condition may comprise, for example, sudden vehicle deceleration caused by a collision. If the collision-indicating condition is above a predetermined threshold level, the sensor 22 closes the switch 20. Electric current is then directed through the inflator 12 to actuate the inflator 12. As a result, the inflator 12 rapidly emits a large volume of inflation fluid which flows into the air bag 14 to inflate the air bag 14.

The air bag 14 and the inflator 12 are mounted on a supporting structure 24 which, in turn, is mounted on a part 26 of the vehicle adjacent to the vehicle occupant compartment 28. The supporting structure 24 could be a reaction canister, a reaction plate, a manifold, or the like. Accordingly, the part 26 of the vehicle on which the supporting structure 24 is mounted could be the instrument panel, the steering column, a door panel, or the like. In any case, the air bag 14 is located in the vehicle with reference to a predetermined occupant position 30 in the occupant compartment 28. As viewed from above in FIGS. 1–3, the inflating air bag 14 moves toward the predetermined occupant position 30 to restrain movement of a vehicle occupant in the opposite direction toward the part 26 of the vehicle on which the air bag 14 is mounted.

The air bag 14 is preferably formed of one or more panels of woven fabric material, as known in the art. As shown in FIGS. 1–3, the air bag 14 has a body portion 40 and an inlet portion 42. When the air bag 14 is being inflated, the body portion 40 of the air bag 14 is moved from the vehicle part 26 into the vehicle occupant compartment 28. The inlet portion 42 of the air bag 14 is retained on the vehicle part 26 by the supporting structure 24.

The body portion 40 of the air bag 14 may have any suitable size and shape, depending upon the particular location of the air bag 14 in the vehicle. In the preferred embodiment of the present invention shown in the drawings, the body portion 40 of the air bag 14 has a generally cylindrical shape which extends longitudinally across a transverse centerline 43 of the air bag 14 when the air bag 14 is in the fully inflated condition of FIG. 2.

The inlet portion 42 of the air bag 14 also may have any suitable size and shape. As shown by way of example in FIG. 4, the inlet portion 42 of the air bag 14 is secured around a retainer ring 44 by stitches 46, and thus has a size and shape corresponding to the size and shape of the retainer ring 44. The retainer ring 44 preferably has a rectangular peripheral shape centered on the centerline 43. In this configuration, the retainer ring 44 and the inlet portion 42 of the air bag 14 together define a rectangular inlet opening 48 centered on the centerline 43. The retainer ring 44 and the inlet portion 42 of the air bag 14 are fastened to the supporting structure 24 (FIG. 1) in a known manner, with the inlet opening 48 being located in a position to receive the inflation fluid emitted from the inflator 12.

If a vehicle occupant is in the predetermined occupant position 30 when the inflator 12 is actuated, the air bag 14 will approach the fully inflated condition of FIG. 2 as it approaches the occupant. The air bag 14 will then apply a restraining force to the occupant primarily in a direction extending along the centerline 43 of the fully inflated air bag 14, as indicated by the arrow shown in FIG. 2. A restraining force is thus applied to the occupant in a direction opposite to the direction in which the occupant tends to move as a result of the collision.

A vehicle occupant may alternatively be in a position closer to the air bag 14 when the inflator 12 is actuated, such as the closer position 50 shown in FIG. 3. The air bag 14 will move against such an out-of-position occupant at a time before the air bag 14 approaches its fully inflated condition. The pressure of the inflation fluid flowing into the air bag 14 at that time could cause the air bag 14 to apply a high inflation force to the out-of-position occupant if such a force were applied to the occupant primarily along the centerline 43, i.e., directly opposite to the direction in which the occupant tends to move as a result of the vehicle collision. Therefore, in accordance with the present invention, the air bag 14 moves against an out-of-position occupant predominantly in a sideways direction extending across the centerline 43, as indicated by the arrow shown in FIG. 3. The inflation force of the air bag 14 is lessened accordingly. This effect of the present invention is a result of the configuration of the air bag 14 when the air bag 14 is in the folded, uninflated condition of FIG. 1.

The air bag 14 is preferably folded into the condition of FIG. 1 in a sequence of folding steps which are illustrated in FIGS. 5–11. Accordingly, the air bag 14 initially has the unfolded condition in which it is shown in cross-section in FIG. 5. (As used in this description, cross-section means a section taken in a plane parallel to the centerline 43.) In that condition, the body portion 40 of the air bag 14 is collapsed such that the air bag 14 has a minimum depth extending from the inlet opening 48 along the centerline 43. The air bag 14 has a length extending across the centerline 43 between opposite ends 52 and 54 of the body portion 40, and has a width extending across the centerline 43 between opposite sides 56 and 58 (FIG. 6) of the body portion 40.

Figure 5:
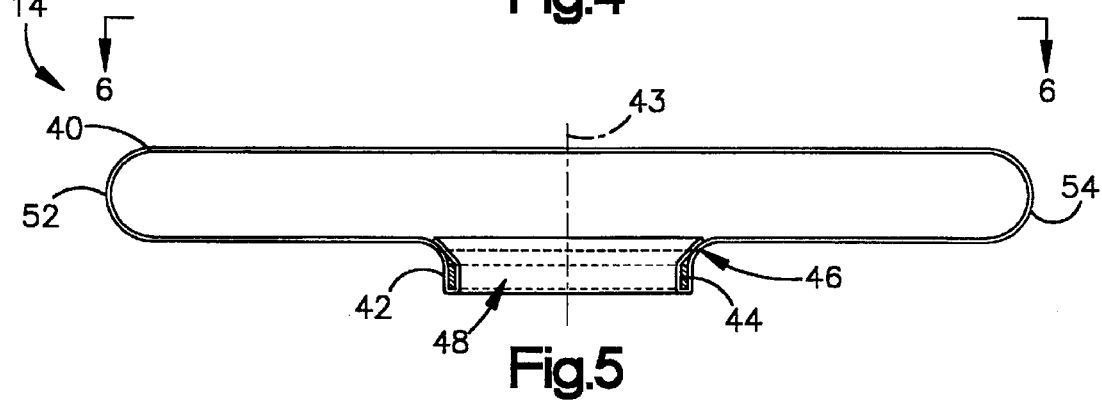
FIG. 5 is a cross-sectional view showing the restraint of FIGS. 1–3 in an initial, unfolded configuration.
Figure 6:
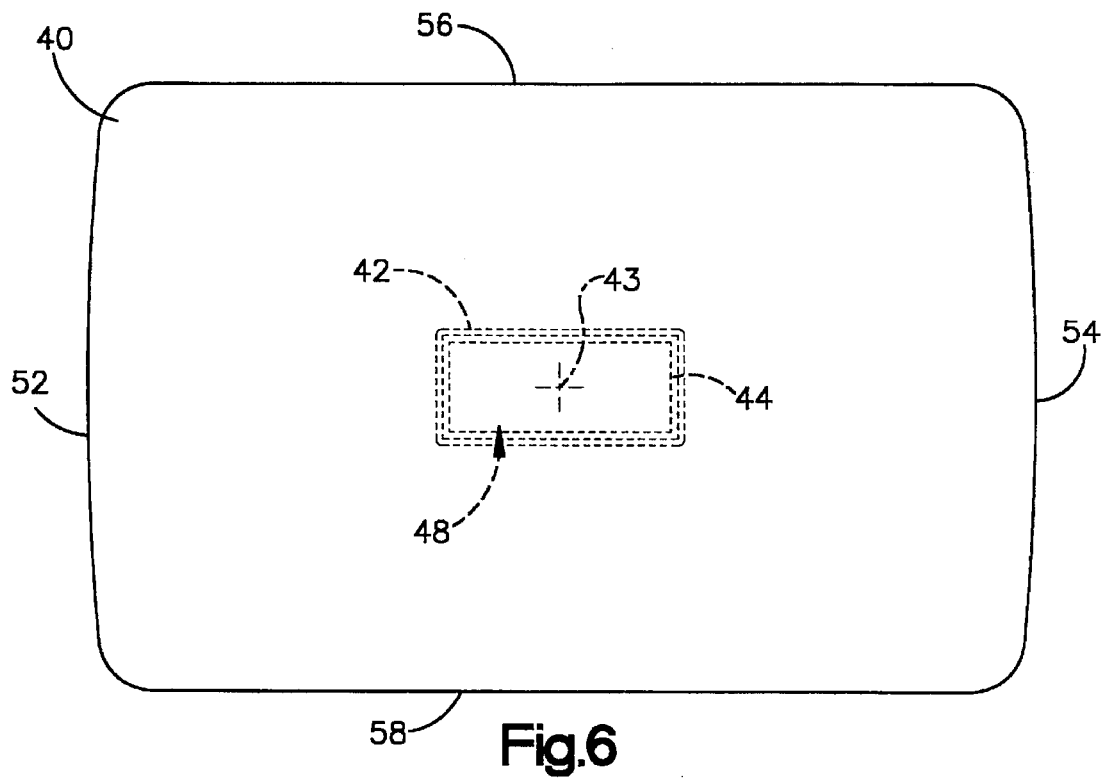
FIG. 6 is a view taken on line 6—6 of FIG. 5.
Figure 7:
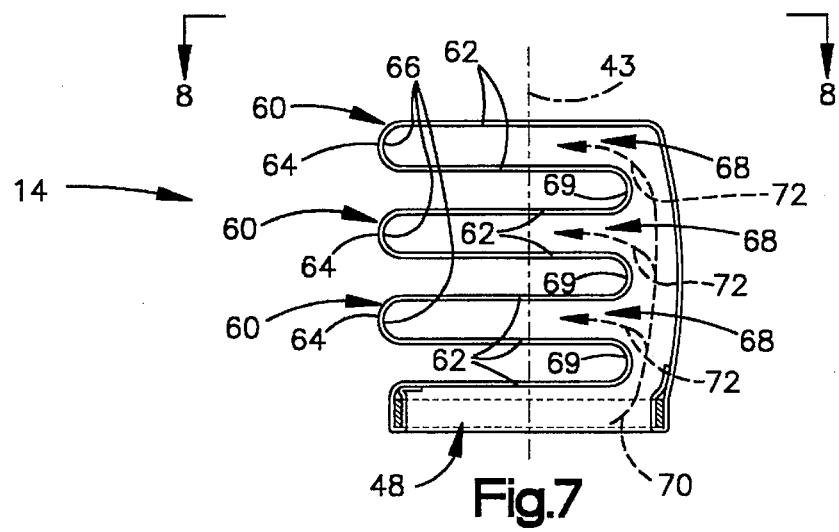
FIG. 7 is a cross-sectional view showing the restraint of FIGS. 1–3 in a partially folded condition.
Figure 8:
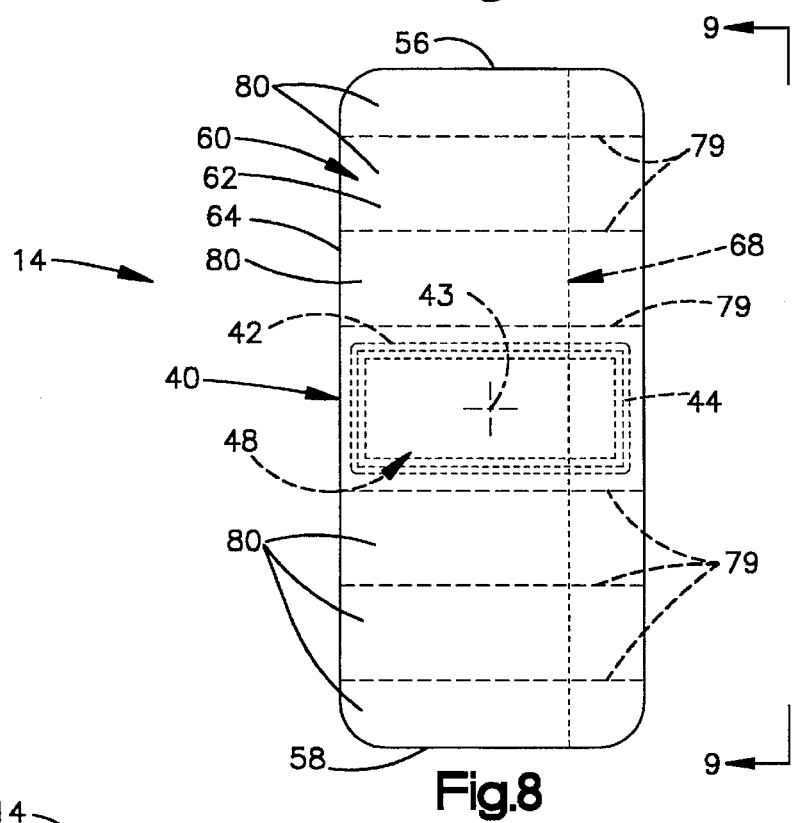
FIG. 8 is a view taken on line 8—8 of FIG. 7.
Figure 9:
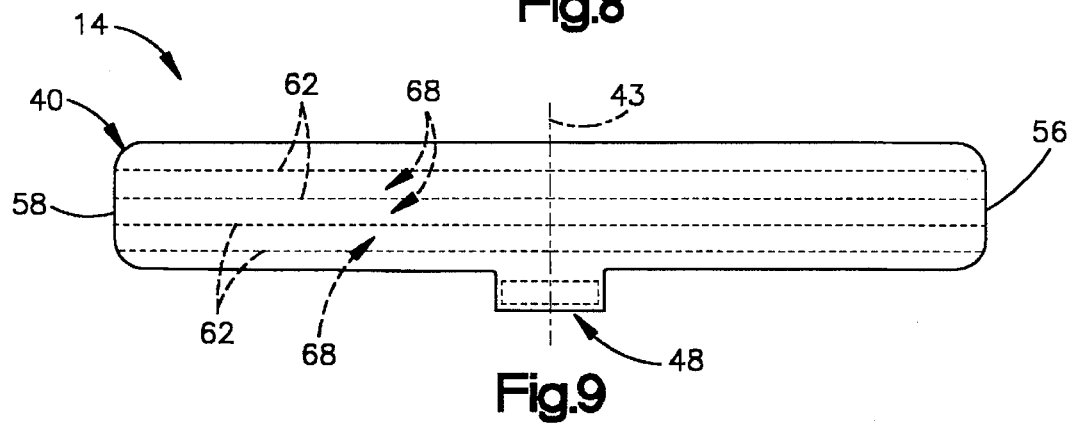
FIG. 9 is a view taken on line 9—9 of FIG. 8.

In an initial folding step, the body portion 40 of the air bag 14 is folded from the initial, unfolded configuration of FIGS. 5 and 6 to the partially folded configuration of FIGS. 7–9. The length of the air bag 14 is thus reduced so as to be approximately equal to the length of the inlet opening 48. The depth of the air bag 14 is simultaneously expanded along the centerline 43. This reduction in length and expansion in depth is accomplished by forming pleats 60 in a stack which extends upward, as viewed in FIG. 7, from the inlet portion 42 of the air bag 14 along the centerline 43. The width of the air bag 14 between the opposite sides 56 and 58 (FIGS. 6 and 8) of the body portion 40 is substantially unchanged by the initial folding step.

In the first embodiment of the present invention, three pleats 60 are formed in the body portion 40 of the air bag 14, as shown in FIGS. 7 and 9. Each pleat 60 is defined by a corresponding pair of adjacent fabric panel sections 62 which are substantially parallel to each other. The two fabric panel sections 62 at each pleat 60 are contiguous with each other along the length of a corresponding folded edge 64 of the fabric material. In the cross-sectional configuration of the air bag 14 shown in FIG. 7, each pleat 60 thus has a closed outer end 66 defined by the corresponding folded edge 64 of the fabric material. Each pleat 60 also has an open inner end 68 opposed to the closed outer end 66. The open inner ends 68 of the pleats 60 are spaced from each other by folded inner edges 69 of the fabric material located between adjacent pairs of the pleats 60. Importantly, all of the pleats 60 extend inward from the closed outer ends 66 to the open inner ends 68 in a single, common sideways direction extending across the inlet opening 48 of the air bag 14 from left to right, as viewed in FIGS. 7 and 8.

In practice of the present invention, the fabric panel sections 62 at the pleats 60 would be stacked in overlying contact with each other when the air bag 14 has been folded into the partially folded condition of FIGS. 7–9. However, for clarity of illustration, the fabric panel sections 62 are shown in positions spaced from each other in FIGS. 7–9. As thus shown in FIG. 7, the air bag 14 defines an inflation fluid flow path 70 with a plurality of branches 72.

Each branch 72 of the flow path 70 extends through a corresponding pleat 60 from the open inner end 68 of the pleat 60 to the closed outer end 66 of the pleat 60. This causes the inflation fluid to move the fabric panel sections 62 in a sideways direction extending from right to left across the centerline 43, as viewed in FIG. 7, when the inflation fluid flows from the inlet opening 48 into the body portion 40 of the air bag 14. The body portion 40 of the air bag 14 is thus moved against and across an out-of-position occupant predominantly in a sideways direction, as described above with reference to FIG. 3.

When the air bag 14 has been folded into the partially folded condition of FIGS. 7–9, it is next folded about a plurality of fold lines 79. As shown in FIG. 8, the fold lines 79 are spaced apart across the width of the body portion 40 of the air bag 14, and are parallel to the sideways direction described above with reference to the inner and outer ends 66 and 68 of the pleats 60. A plurality of substantially rectangular sections 80 of the body portion 40 are delineated by the fold lines 79. The rectangular sections 80 are moved pivotally about the fold lines 79 so as to place the air bag 14 in the intermediate folded condition of FIG. 10. The folds which are formed in the body portion 40 in this manner are known as Z-folds. The width of the air bag 14 is thus reduced by moving the opposite sides 56 and 58 (FIG. 8) of the body portion 40 toward the inlet portion 42. The overlapping rectangular sections 80 on opposite sides of the centerline 43 then define corresponding halves 82 and 84 of the body portion 40.

The halves 82 and 84 of the body portion 40 on opposite sides of the centerline 43, as shown in FIG. 10, are folded about the innermost pair of fold lines 79 adjacent to the inlet opening 48. The overlapping rectangular sections 80 of the air bag 14 are thus tucked through the inlet opening 48 so that the width of the air bag 14, as shown in the fully folded condition of FIG. 11, is approximately equal to the width of the inlet opening 48. The body portion 40 of the air bag 14 is then contained about its length and width by the inlet portion 42. The air bag 14 can then be mounted on the supporting structure 24, as shown in FIG. 1.

In the first embodiment of the present invention described above, the pleats 60 shown in FIG. 7 extend equal distances from the closed outer ends 66 to the open inner ends 68. Moreover, all of the pleats 60 extend across the centerline 43 such that the closed outer ends 66 and the open inner ends 68 are located on respective opposite sides of the centerline 43. These particular features may differ in alternative embodiments of the present invention.

For example, a second embodiment of the present invention includes an alternative air bag 100, as shown partially in FIG. 12. The cross-sectional view of the air bag 100 in FIG. 12 corresponds with the cross-sectional view of the air bag 14 in FIG. 7. The air bag 100 has parts which are substantially the same as corresponding parts of the air bag 14. This is indicated by the use of the same reference numbers in FIGS. 12 and 7. However, the air bag 100 differs from the air bag 14 in that the air bag 100 has pleats 102 which extend unequal distances inward from their closed outer ends 104 to their open inner ends 106. The pleats 102 are preferably arranged in a stack in which the open inner end 106 of each overlying pleat 102 is spaced inward (i.e., to the right, as viewed in FIG. 12) from the open inner end 106 of an adjacent underlying pleat 102, with at least two of the open inner ends 106 being located on respective opposite sides of the centerline 43.

A third embodiment of the present invention is similarly shown partially in FIG. 13. The third embodiment comprises an alternative air bag 120 which, like the air bag 100 of FIG. 12, has a stack of pleats 122 extending unequal distances inward in a sideways direction from their closed outer ends 124 to their open inner ends 126. Rather than extending over the inlet opening 48, the pleats 120 are offset from the inlet opening 48 in an opposite sideways direction.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   an inflatable air bag having an inflation fluid inlet opening; and
   means for supporting said air bag on a vehicle panel at a location from which said restraint is inflatable toward a predetermined vehicle occupant position in a first direction so as to restrain movement of a vehicle occupant in a second, opposite direction;
   said air bag having a folded condition with a cross-sectional configuration extending across said inlet opening, said cross-sectional configuration being defined by a total number of pleats having closed outer ends and open inner ends for receiving inflation fluid from said inlet opening;
   all of said total number of pleats extending inward across said cross-sectional configuration from said closed outer ends to said open inner ends in a single, common sideways direction;
   said sideways direction extending horizontally across said first and second directions, whereby said pleats comprise means for causing said air bag to inflate in said sideways direction horizontally against and across an out-of-position vehicle occupant located between said vehicle panel and said predetermined vehicle occupant position.

2. Apparatus as defined in claim 1 wherein said vehicle panel is an instrument panel.

3. Apparatus as defined in claim 1 wherein said vehicle panel is a door panel.

4. Apparatus as defined in claim 1 wherein said pleats extend equal distances inward in said sideways direction from said closed outer ends to said open inner ends.

5. Apparatus as defined in claim 1 wherein said pleats extend unequal distances inward in said sideways direction from said closed outer ends to said open inner ends.

6. Apparatus as defined in claim 1 wherein said pleats are arranged in a stack in which the open inner end of each overlying pleat is spaced inward in said sideways direction from the open inner end of an adjacent underlying pleat.

7. Apparatus as defined in claim 1 wherein said inlet opening has a centerline perpendicular to said sideways direction, at least one of said pleats extending inward across said centerline in said sideways direction.

8. Apparatus as defined in claim 1 wherein said cross-sectional configuration has a centerline perpendicular to said sideways direction, at least one of said pleats extending inward across said centerline in said sideways direction.

9. Apparatus as defined in claim 8 wherein at least two of said open inner ends of said pleats are located on respective opposite sides of said centerline.

10. Apparatus as defined in claim 9 wherein said inlet opening is centered on said centerline.

11. Apparatus as defined in claim 1 wherein said air bag has a fully folded condition from which it is unfolded and inflated upon receiving inflation fluid through said inlet opening, said pleats comprising means for defining said folded condition of said air bag as a partially folded condition from which said air bag is foldable into said fully folded condition.

12. Apparatus comprising:
    an inflatable air bag having an inflation fluid inlet opening; and
    means for supporting said air bag on a vehicle instrument panel at a location from which said restraint is inflatable toward a predetermined vehicle occupant position in a rearward direction so as to restrain movement of a vehicle occupant oppositely in a forward direction;
    said air bag having a folded condition with a cross-sectional configuration extending across said inlet opening, said cross-sectional configuration being defined by a total number of pleats having closed outer ends and open inner ends for receiving inflation fluid from said inlet opening;
    all of said total number of pleats extending inward across said cross-sectional configuration from said closed outer ends to said open inner ends in a single, common sideways direction;

said sideways direction extending across said forward and rearward directions and extending horizontally between right and left sides of said predetermined vehicle occupant position, whereby said pleats comprise means for causing said air bag to inflate against and across an out-of-position vehicle occupant horizontally between the right and left sides of the out-of-position vehicle occupant.

13. Apparatus as defined in claim 12 wherein said pleats extend equal distances inward in said sideways direction from said closed outer ends to said open inner ends.

14. Apparatus as defined in claim 12 wherein said pleats extend unequal distances inward in said sideways direction from said closed outer ends to said open inner ends.

15. Apparatus as defined in claim 12 wherein said pleats are arranged in a stack in which the open inner end of each overlying pleat is spaced inward in said sideways direction from the open inner end of an adjacent underlying pleat.

16. Apparatus as defined in claim 12 wherein said inlet opening has a centerline perpendicular to said sideways direction, at least one of said pleats extending inward across said centerline in said sideways direction.

17. Apparatus as defined in claim 12 wherein said cross-sectional configuration has a centerline perpendicular to said sideways direction, at least one of said pleats extending inward across said centerline in said sideways direction.

18. Apparatus as defined in claim 17 wherein at least two of said open inner ends of said pleats are located on respective: opposite sides of said centerline.

19. Apparatus as defined in claim 18 wherein said inlet opening is centered on said centerline.

20. Apparatus as defined in claim 12 wherein said air bag has a fully folded condition from which it is unfolded and inflated upon receiving inflation fluid through said inlet opening, said pleats comprising means for defining said folded condition of said air bag as a partially folded condition from which said air bag is foldable into said fully folded condition.

* * * * *